3,160,565
ENHANCING THE ABSORPTION OF ORALLY ADMINISTERED MEDICAMENT WITH DISACCHARIDE FATTY ACID ESTERS
Helen E. Duell, Levittown, Pa., assignor to Smith Kline & French Laboratories, Philadelphia, Pa., a corporation of Pennsylvania
No Drawing. Continuation of application Ser. No. 757,125, Aug. 25, 1958. This application Aug. 9, 1962, Ser. No. 215,787
4 Claims. (Cl. 167—82)

This invention relates to oral medicinal preparations and, particularly, relates to oral medicinal preparations which demonstrate enhanced absorption of cobalamin vitamins, antibiotics and iron preparations.

Cyanocobalamin (vitamin $B_{12}$) is not rapidly absorbed following oral administration. The use of the composition of this invention containing polysaccharide esters of fatty acids give markedly enhanced absorption of the cobalamin vitamins and, unexpectedly, raises the tissue levels without the need for parenteral administration or admixed intrinsic factor. This is of great importance, for example, in the treatment of anemias and for the treatment of geriatric patients since they normally absorb very little of the cobalamin vitamins. The enhancement of the absorption of cyanocabalamin by using the composition of this invention is a particularly novel aspect of this invention and these compositions are therefore preferred.

Antibiotics, such as streptomycin, kanamycin, tetracycline, chlortetracycline or hydroxytetracycline are also poorly absorbed from the gastrointestinal tract, thereby making oral treatment of infectious diseases difficult, if not impossible. Since these antibiotics are commonly used, and often, vital medication, maintenance of enhanced and prolonged blood levels of the antibiotic followed absorption from the gastro-intestinal tract is very important. Also, since these antibiotics are expensive, enhanced absorption reduces the cost of each dose.

The compositions of this invention when the medicinally active constituent is an iron compound are also very useful in treating various hypochromic anemias associated with iron deficiency, such as those caused by blood loss, poor iron absorption of orally administered iron or inadequate dietary intake of iron.

The novel oral preparation in accordance with this invention therefore has as its essential ingredients a medicinally active ingredient which is a cobalamin vitamin, an iron compound, or a streptomycin or tetracycline nucleus antibiotic and a polysaccharide fatty acid ester compound.

The polysaccharide ester of the fatty acid for example may be an ester formed from a disaccharide such as maltose, lactose, melibiose, trehalose cellobiose, gentiobiose and, preferably, sucrose which is esterified with from one to three moles of fatty acid per mole of sugar. The fatty acid component of the ester is an aliphatic monocarboxylic acid of from 9 to 22 carbon atoms, such as pelargonic, capric, lauric, myristic, palmitic, stearic, behenic and oleic acids. Mixtures of such esters may also be employed. The preferred polysaccharide fatty acid esters are sucrose monopalmitate and sucrose dipalmitate or, most advantageously, a mixture thereof.

The minimum amount of polysaccharide fatty acid ester present will be .1 gram. The polysaccharide ester can be used in as large amounts in the preparations as can be conveniently used, large amounts tending to further enhance the absorption of the medicament. It has been found to be satisfactory to employ the polysaccharide ester in an amount of approximately .1 gram to about 4 grams, as a matter of general practice from .4 gram to 3 grams. When the preparation of this invention is in the form of a liquid, the amount of polysaccharide fatty acid ester constituent is from about 2.0 grams to about 30 grams per 100 ml. An excess of the polysaccharide ester is no disadvantage if the pharmaceutical elegance of the preparation is maintained. The preparation is in the form of a suspension when up to 20 grams per 100 ml. of polysaccharide ester is used. When 30 grams per 100 ml. of polysaccharide ester is used, a gel is the resulting product.

When a solid carrier is used, the polysaccharide fatty acid ester is present in amount of from about .1 gram to about 4 grams. An excess of the polysaccharide ester again being no disadvantage but being limited only by the physical limitations of the dosage form. The preparation which employs a solid carrier may be in the form of a lozenge, troche, capsule, powder or tablet. The carrier or diluent employed is, for example, starch, talc, lactose, stearic acid, magnesium stearate, calcium sulfate or gelatin. The use of the ester as a very active enhancement factor is a distinct advantage because it permits solid preparations of a size readily acceptable to the patient and yet showing remarkably increased absorption of the medicinally active constituent.

The preferred cobalamin vitamin constituent of this composition is vitamin $B_{12}$, cyanocabalamin. Exemplary of other satisfactory cobalamin vitamins are the compounds where a nontoxic radical, such as hydroxy, nitro or chloro radical, replaces the cyano radical in cyanocobalamin, for example, hydroxycobalamin ($B_{12b}$), anhydrous hydroxycobalamin ($B_{12a}$), nitrocobalamin ($B_{12c}$) and chlorocobalamin. Further examplary examples of satisfactory cobalamin vitamins are cobalamin, dicyanocobalamin, thiocyantocobalamin, sulfatocobalamin, sulfitocobalamin and the hydrogen sulfide addition product of cyanocobalamin. The cobalamin vitamin will be present in an amount of from about 1 to about 100 micrograms per unit dosage or from about 20 micrograms to 2500 micrograms percent, that is micrograms per 100 ml. of finished preparation when a liquid carrier is used.

Exemplary of the nontoxic iron salts used in this medicinal oral preparation are ferrous sulfate, ferrous fumarate, soluble ferric pyrophosphate, ferrous lactate, ferric ammonium citrate, ferrous gluconate, insoluble ferric pyrophosphate, ferrous calcium citrate and complex iron salts, such as ferrous choline citrate or ferrous glycinate. The preferred iron salt is soluble ferric pyrophosphate. It is preferred to have from about 3 mg. to about 100 mg., advantageously from about 10 mg. to about 60 mg. of elemental iron present. Elemental iron is that percentage of the iron salt which represents pure iron only. For example, ferrous sulfate has 20.09% iron present, so 20.09% of the ferrous sulfate present in the preparation would be elemental iron.

The antibiotic constituent of the composition of this invention is, for example, a tetracycline nucleus antibiotic such as tetracycline, chlorotetracycline and oxytetracycline or a streptomycin nucleus antibiotic such as streptomycin, dihydrostreptomycin or kanamycin. The antibiotic may be present either as the base itself or as a pharmaceutically acceptable nontoxic salt, preferably a salt of a nontoxic mineral acid, such as the hydrochloride or sulfate. When the antibiotic is amphoteric, such as the case of the tetracycline nucleus antibiotics, a nontoxic salt with either a cation or anion can be employed. The unit dosage of the antibiotic will include from about .025 gram of the antibiotic to about 1.5 grams. When a tetracycline nucleus antibiotic is employed, the advantageous unit dose range of the antibiotic will be from about 75 mg. to about 350 mg. When the preferred streptomycin nucleus antibiotics are used, the advantageous range of the antibiotic will be from about 0.250 gram to about 1.50 grams per unit dose. In the presence of a liquid carrier, the advantageous range of antibiotic is about 1.5 percent w./v. to about 7.0 percent w./v. When streptomycin is in a liquid form it will be present preferably from about 5.0 percent w./v. to about 30.0 percent w./v.

In their most advantageous forms, the preparation in accordance with this invention will also comprise a carrier in addition to the medicinal agent, namely the cobalamin vitamin, the antibiotic, or the iron and the polysaccharide fatty acid. The carrier can be either in the form of a liquid vehicle such as an aqueous vehicle or a solid carrier. When the preferred liquid carrier is used it will be added in an amount to bring the volume of the preparation up to 100% or to a volume of about 15 ml. for a tablespoon dosage or about 5 ml. for a teaspoon dosage.

Preparations in accordance with this invention are readily made using the simple techniques well-known to the art. In the case of a liquid product, preferably dissolve the cobalamin vitamin, iron salt, antibiotic or any other soluble medicament to be added and then suspend the polysaccharide fatty acid ester in a portion of the liquid such as water. Sufficient liquid can then be added to bring the preparation to the desired volume. In the case of the tablets, lozenges or troches, the ingredients are simply mixed together and compressed to the desired weight. If granulation is necessary, this can be done by using a granulating solution such as 10% gelatin solution.

Other pharmaceutical agents may be added if desired, for example, a lipotropic agent, such as betaine or choline or methionine, and "B" vitamins, such as riboflavin, pyridoxine hydrochloride or nicotinamide. Any desired pharmaceutically compatible adjuncts may be added to the preparation.

The preparation of this invention also can be used in veterinary practice. The preparation can be given per se or as an additive to the feed or drinking matter of the animals. In veterinary practice better absorption not only provides better medication, but also is a matter of saving to the owner because the high cost of antibiotics is often a limiting factor in the treatment of his animals. The advantageous ratios of the cobalamin vitamins to the polysaccharide ester is from about 1 to 1000 to about 1 to 4,000,000. The advantageous ratios of elemental iron to the polysaccharide ester is from about 1 to 1 to about 1 to 1333. The advantageous ratios of the antibiotic will be from about 1 to 0.75 to about 1 to 160.

The invention will be further clarified by the following specific examples of preparations in accordance with this invention.

Example 1

| | | |
|---|---|---|
| Vitamin $B_{12}$ | micrograms | 100 |
| Sucrose dipalmitate | gms | 5 |
| Water, q.s. to make volume of preparation 100 cc. | | |

Example 2

| | | |
|---|---|---|
| Vitamin $B_{12}$ | micrograms | 165 |
| Sucrose dipalmitate | gms | 10 |
| Streptomycin sulfate | gms | 10.0 |
| Water, q.s. to make volume of preparation 100 cc. | | |

Example 3

| | | |
|---|---|---|
| Vitamin $B_{12}$ | micrograms | 1000 |
| Sucrose dipalmitate | gms | 20 |
| Soluble ferric pyrophosphate | gms | 2.00 |
| Streptomycin sulfate | gms | 10.00 |
| Water, q.s. to make volume of preparation 100.00 cc. | | |

Example 4

| | | |
|---|---|---|
| Vitamin $B_{12}$ | micrograms | 2500 |
| Sucrose mono-dipalmitate (mixture of each) | gms | 25 |
| Ferric ammonium citrate | gms | 2.0 |
| Purified water, q.s. to 100.0 ml. | | |

Example 5

| | | |
|---|---|---|
| Vitamin $B_{12}$ | micrograms | 200 |
| Riboflavin | gm | 0.012 |
| Vitamin $B_6$ | gm | 0.04 |
| Nicotinamide | gm | 0.14 |
| Betaine | gms | 10.00 |
| Soluble ferric pyrophosphate | gm | 1.00 |
| Sucrose trilaurate | gms | 20.00 |
| Water, q.s. to make volume of preparation 100.00 cc. | | |

Example 6

| | | |
|---|---|---|
| Vitamin $B_{12}$ | micrograms | 8.30 |
| Vitamin $B_6$ | mg | 2.00 |
| Folic acid | mg | 0.50 |
| Ferric pyrophosphate (soluble) | mg | 200.00 |
| Sucrose monodipalmitate | gms | 3.70 |
| Starch | mg | 50.00 |
| Magnesium stearate | mg | 40.00 |
| Citric acid | mg | 50.00 |
| Cherry flavor | mg | 2.00 |

The ingredients are mixed and compressed into the form of a lozenge.

Example 7

| | | |
|---|---|---|
| Vitamin $B_{12}$ | micrograms | 2.00 |
| Streptomycin sulfate | gm | 0.50 |
| Vitamin $B_6$ | mg | 2.00 |
| Folic acid | mg | 0.50 |
| Ferrous lactate | gm | 0.50 |
| Sucrose monomyristate | gm | 0.50 |

The powders are mixed and filled into a No. 0 hard gelatin capsule. If more or less ingredients are desired, this can be regulated by using the proper size capsule.

Example 8

| | | |
|---|---|---|
| Vitamin $B_{12}$ | micrograms | 10 |
| Sucrose monostearate (SME 80) | gm | 4.0 |
| Soluble ferric pyrophosphate | gm | 0.5 |
| Tetracycline hydrochloride | gm | 0.125 |
| Lemon-lime flavor | mg | 2.00 |
| Citric acid | mg | 20.00 |
| Magnesium stearate | mg | 40.00 |
| Starch | mg | 50.00 |

The vitamin $B_{12}$ sucrose monostearate, soluble ferric pyrophosphate and tetracycline hydrochloride are granulated with a 10% gelatin solution, the wet granulation is screened through a #8 mesh screen, dried at 120° F. overnight, the dried material is screened through a #20 mesh screen, mixed with the other ingredients, and then compressed on a standard tablet machine.

Example 9

| | | |
|---|---|---|
| Streptomycin sulfate | | 10.0 |
| Sucrose monostearate (SME 80) | gms | 10.0 |
| Oil of peppermint | ml | 0.05 |
| Purified water, q.s. to 100.0 ml. | | |

Example 10

| | Gm. |
|---|---|
| Exsiccated ferrous sulfate | 0.150 |
| Maltose dipalmitate | 1.500 |

Mix powders well and place into a No. 0 hard gelatin capsule.

Example 11

| | | |
|---|---|---|
| Vitamin $B_{12}$ | micrograms | 500.0 |
| Lactose monostearate | gms | 5.0 |
| Exsiccated ferrous sulfate | gms | 4.0 |
| Imitation wild cherry flavor | ml | 0.1 |
| Purified water, q.s. to 100.0 ml. | | |

Example 12

| | | |
|---|---|---|
| Hydroxycobalamin | micrograms | 200.0 |
| Ferrous gluconate | gms | 6.0 |
| Sucrose monodipalmitate (mixture) | gms | 7.0 |
| Imitation wild cherry flavor | ml | 0.1 |
| Purified water, q.s. to 100.0 ml. | | |

Example 13

| | | |
|---|---|---|
| Nitrocobalamin | micrograms | 500.0 |
| Streptomycin sulfate | gms | 15.0 |
| Lactose dipalmitate | gms | 5.0 |
| Oil of peppermint | mg | 0.05 |
| Purified water, q.s. to 100.0 ml. | | |

Example 14

| | | |
|---|---|---|
| Dicyanocobalamin | micrograms | 165.0 |
| Choline dihydrogen citrate | gms | 2.0 |
| Betaine | gms | 10.0 |
| Sucrose monopalmitate | gms | 25.0 |
| Purified water, q.s. to 100.0 ml. | | |

Example 15

| | | |
|---|---|---|
| Chlorocobalamin | micrograms | 8.00 |
| Soluble ferric pyrophosphate | mg | 125.0 |
| Maltose monostearate | gms | 2.0 |
| Starch | mg | 50.0 |
| Magnesium stearate | mg | 40.0 |
| Citric acid | mg | 30.0 |
| Lemon-lime flavor | mg | 4.0 |

The ingredients are intimately mixed and compressed into the form of a lozenge.

Example 16

| | | |
|---|---|---|
| Thiocyanotocobalamin | micrograms | 200.0 |
| Sucrose dipalmitate | gms | 15.0 |
| Streptomycin sulfate | gms | 15.0 |
| Purified water, q.s. to 100.0 ml. | | |

Example 17

| | | |
|---|---|---|
| Sulfatocobalamin | micrograms | 500.0 |
| Exsiccated ferrous sulfate | gms | 4.0 |
| Methylparaben | gm | 0.0625 |
| Propylparaben | gm | 0.0125 |
| Sucrose monostearate | gms | 10.0 |
| Purified water, q.s. to 100.0 ml. | | |

Example 18

| | | |
|---|---|---|
| Sulfatocobalamin | micrograms | 2.5 |
| Sucrose dibehenate | gms | 1.5 |

Mix ingredients and fill into a No. 1 hard gelatin capsule.

Example 19

| | | |
|---|---|---|
| Vitamin $B_{12}$ | micrograms | 5.0 |
| Soluble ferric pyrophosphate | gms | 8.0 |
| Sucrose dipelargonate | gms | 15.0 |
| Chlortetracycline hydrochloride | gms | 0.100 |
| Imitation wild cherry flavor | ml | 0.10 |
| Purified water, q.s. to 100.0 ml. | | |

Example 20

| | | |
|---|---|---|
| Kanamycin | gms | 10.0 |
| Sucrose Monostearate | gms | 15.0 |
| Methylparaben | gms | 0.0625 |
| Propylparaben | gms | 0.0125 |
| Imitation wild cherry | ml | 0.15 |
| Purified water, q.s. to 100.0 ml. | | |

Example 21

| | | |
|---|---|---|
| Tetracycline hydrochloride | gms | 1.50 |
| Sucrose dipalmitate | gms | 10.00 |
| Oil of peppermint | ml | 0.05 |
| Purified water q.s. to 100.0 ml. | | |

This is a continuation application based on my copending patent application, Serial No. 757,125, filed August 25, 1958, now abandoned.

What is claimed:

1. The method of enhancing the absorption of an orally administered medicament selected from the group consisting of iron salts, cyanocobalamin, hydroxycobalamin, nitrocobalamin, chlorocobalamin, dicyanocobalamin, thiocyantocobalamin, sulfatocobalamin, sulfitocobalamin, tetracycline, chlortetracycline, oxytetracycline, streptomycin, dihydrostreptomycin and kanamycin which comprises orally administering concurrently with said medicament a fatty acid ester of a disaccharide selected from the group consisting of sucrose, maltose, lactose, melibiose, trehalose, cellobiose and gentiobiose, said fatty acid being an aliphatic carboxylic acid having from 9 to 22 carbon atoms.

2. The method of claim 1 characterized in that the medicament is cyanocobalamin.

3. The method of claim 1 characterized in that the medicament is tetracycline.

4. The method of claim 1 characterized in that the medicament is an iron salt.

References Cited in the file of this patent

UNITED STATES PATENTS

| | | |
|---|---|---|
| 2,805,977 | Robinson et al. | Sept. 10, 1957 |
| 2,823,167 | Newmark | Feb. 11, 1958 |
| 2,851,394 | Vaughan | Sept. 9, 1958 |
| 2,875,130 | Grass et al. | Feb. 24, 1959 |
| 2,951,015 | Berger et al. | Aug. 30, 1960 |

OTHER REFERENCES

Osipow: "The Sugar Esters in Cosmetics," Jl. Soc. Cos. Chemists, vol. 7, No. 3, pages 249–255, May 1956.

Osipow et al.: "Fatty Acid Esters of Sucrose," Ind. Eng. Chem., vol. 48, No. 9, pages 1459–1464, September 1956.

Osipow et al.: "Sugar Esters as Detergents," Chem. Prods., vol. 20, pages 101–106, March 1957.

Osipow et al.: "The New Sugar Esters," Int. Sugar Journal, vol. 59, pages 68–70, March 1957.

Hass: "The Sugar Detergents," Manufacturing Chemist, vol. 29, pages 152–153, April 1958.